US011182827B2

(12) United States Patent
Krause

(10) Patent No.: US 11,182,827 B2
(45) Date of Patent: Nov. 23, 2021

(54) MOBILE COMMUNICATION DEVICE AWARENESS AND GUIDANCE FOR CUSTOMER ASSISTANCE APPLICATIONS

(71) Applicant: NewStore Inc., Boston, MA (US)

(72) Inventor: Kai-Thomas Krause, Hannover (DE)

(73) Assignee: NewStore Inc., Boston, MA (US)

( * ) Notice: Subject to any disclaimer, the term of this patent is extended or adjusted under 35 U.S.C. 154(b) by 1139 days.

(21) Appl. No.: 15/281,392

(22) Filed: Sep. 30, 2016

(65) Prior Publication Data

US 2017/0091819 A1 Mar. 30, 2017

Related U.S. Application Data

(60) Provisional application No. 62/234,777, filed on Sep. 30, 2015.

(51) Int. Cl.
*G06Q 30/00* (2012.01)
*G06Q 30/02* (2012.01)
*G06Q 30/06* (2012.01)

(52) U.S. Cl.
CPC ..... *G06Q 30/0259* (2013.01); *G06Q 30/0619* (2013.01)

(58) Field of Classification Search
CPC .................................................. G06Q 30/0259
See application file for complete search history.

(56) References Cited

U.S. PATENT DOCUMENTS

| 6,587,835 | B1* | 7/2003 | Treyz | G06Q 20/12 |
| | | | | 705/14.64 |
| 9,224,113 | B2* | 12/2015 | Grigg | G06Q 10/063114 |
| 9,380,417 | B1* | 6/2016 | Boyle | H04W 4/023 |
| 2013/0304578 | A1* | 11/2013 | Kannan | G06Q 30/0261 |
| | | | | 705/14.54 |
| 2015/0095129 | A1* | 4/2015 | Daigle | G06Q 30/0231 |
| | | | | 705/14.27 |
| 2015/0242770 | A1* | 8/2015 | Song | G06Q 10/0631 |
| | | | | 705/7.12 |
| 2016/0012496 | A1* | 1/2016 | Hanson | H04W 4/02 |
| | | | | 705/323 |
| 2016/0110782 | A1* | 4/2016 | Tadajewski | G06Q 30/0601 |
| | | | | 705/14.37 |
| 2016/0253691 | A1* | 9/2016 | Dante, III | G06Q 30/0207 |
| | | | | 705/14.1 |

* cited by examiner

*Primary Examiner* — Naresh Vig
(74) *Attorney, Agent, or Firm* — Intrinsic Law Corp.

(57) ABSTRACT

A method and system for assisting customers in determining a best retail store location, reaching the location and obtaining assistance from a retail store associate at the location is disclosed. The method employs mobile communication device hardware, software and communication network infrastructure as well as near-field transmitters and receivers to achieve beacon orientation and location functionality.

20 Claims, 8 Drawing Sheets

MOBILE COMMUNICATION DEVICE AWARENESS AND GUIDANCE FOR CUSTOMER ASSISTANCE APPLICATIONS

CROSS-REFERENCE TO RELATED APPLICATIONS

This application is related to and claims priority to U.S. Provisional Patent Application No. 62/234,777, filed on Sep. 30, 2015, entitled "Systems and Methods for Integrating Customer Data Across Retail Environments," which is hereby incorporated by reference.

TECHNICAL FIELD

This application relates to systems and methods for integrating e-commerce and traditional retail environments to improve customer satisfaction, including through mobile device communications to assist customers to locating and using an optimum retail environment.

BACKGROUND

Some aspects of today's retail commerce are barely connected to the online world even if most retailers have some kind of online presence. The experience of the customer using mobile devices is not necessarily connected to the brick and mortar shopping experience, which leads to less than optimal customer experiences when using either a retailer's online services or the retailer's stores, and also reduces the effectiveness of the retailer in serving the customer overall.

Retail stores today generally have an e-commerce platform and one or more traditional brick-and-mortar stores. Customer data is collected separately for each retail environment, but there are no known systems that combine the data to provide a comprehensive view of a customer's actions and preferences.

Current technologies offer mobile device-based shopping applications. Others offer navigation assistance to guide a device user from one location to another. Yet others offer communication functions such as customer assistance lines. But in all, there is no acceptable and integrated way to service, monitor and guide a customer through the process of locating and obtaining assistance with regard to acquiring a service or purchased goods.

Some embodiments are directed to a method for enhancing retail services to customers of a retail store, comprising on a first mobile communication device associated with a retail customer, activating a retail application executing in a processor of said first mobile communication device; establishing a communication link between said first mobile communication device and a server responsive to activation of said retailer application on the first mobile communication device; using geographic location circuitry in said first mobile communication device to determine a geographic location of the first mobile communication device; responsive to activation of said retailer application, and based at least in part on said geographic location of the first mobile communication device, determining a preferred retail store location; providing to said first mobile communication device a retail store identifier corresponding to the preferred retail store location, the first mobile communication device storing said retail store identifier in a memory unit in the first mobile communication device; activating a beacon signal receiver circuit in said first mobile communication device responsive to a wireless beacon signal encoding the retail store identifier, said beacon signal receiver generating an output responsive to a wireless beacon signal broadcast by a beacon transmitter located at said preferred retail store location; the beacon receiving circuit of said first mobile communication device providing an output to a processor in said first mobile communication device, said processor confirming that the received beacon signal encodes the retail store identifier provided above by comparing data from said received beacon signal with the retail store identifier stored in said memory unit; sending, from said first mobile communication device, over said cloud-based communication network, a first signal to a server coupled to said cloud-based communication network; and sending a notification message to a second mobile communication device associated with an associate of said retail store, the notification message indicative of an arrival event of the customer associated with said first mobile communication device with respect to the preferred retail store location.

Other embodiments are directed to communication and signaling systems adapted and arranged to perform the foregoing method, including an arrangement of suitable computing servers, data stores, data communication networks, client mobile communication devices with respective user interfaces and transceivers for receiving and/or transmitting communication signals, including short range wireless beacon radio frequency or similar signals emitted by a corresponding beacon transmitter.

BRIEF DESCRIPTION OF THE DRAWINGS

For a fuller understanding of the nature and advantages of the present invention, reference is made to the following detailed description of preferred embodiments and in connection with the accompanying drawings, in which.

DETAILED DESCRIPTION

This disclosure allows a retailer to provide an integrated and seamless shopping experience for customers. In particular, the disclosure allows retailers to improve customer service in traditional brick and mortar store locations (herein, "traditional stores") by providing customer information and shopping recommendations using the customers' online shopping history, personal profiles, or other information pertaining to a customer. In addition, this disclosure allows sales associates to know the identity of the customers coming to and/or entering the store, where the customers go within the store, how long the customers stay in a given location or department in the store. In some aspects, a sales associate can provide a recommendation of a product based on what the customer has purchased online and/or in the store. In other aspects, a sales associate can interact with and assist a customer in a transaction.

Certain components and steps of the present system and methods may be implemented according to the present Applicant's disclosure of Jul. 6, 2016, bearing application Ser. No. 15/202,977, claiming priority to U.S. Provisional Application 62/188,908, filed on Jul. 6, 2015, and to Applicant's disclosure of Sep. 28, 2016, bearing application Ser. No. 15/278,387, claiming priority to U.S. Provisional Application 62/233,792, filed on Sep. 28, 2015, all of which are hereby incorporated by reference.

Figure 1:
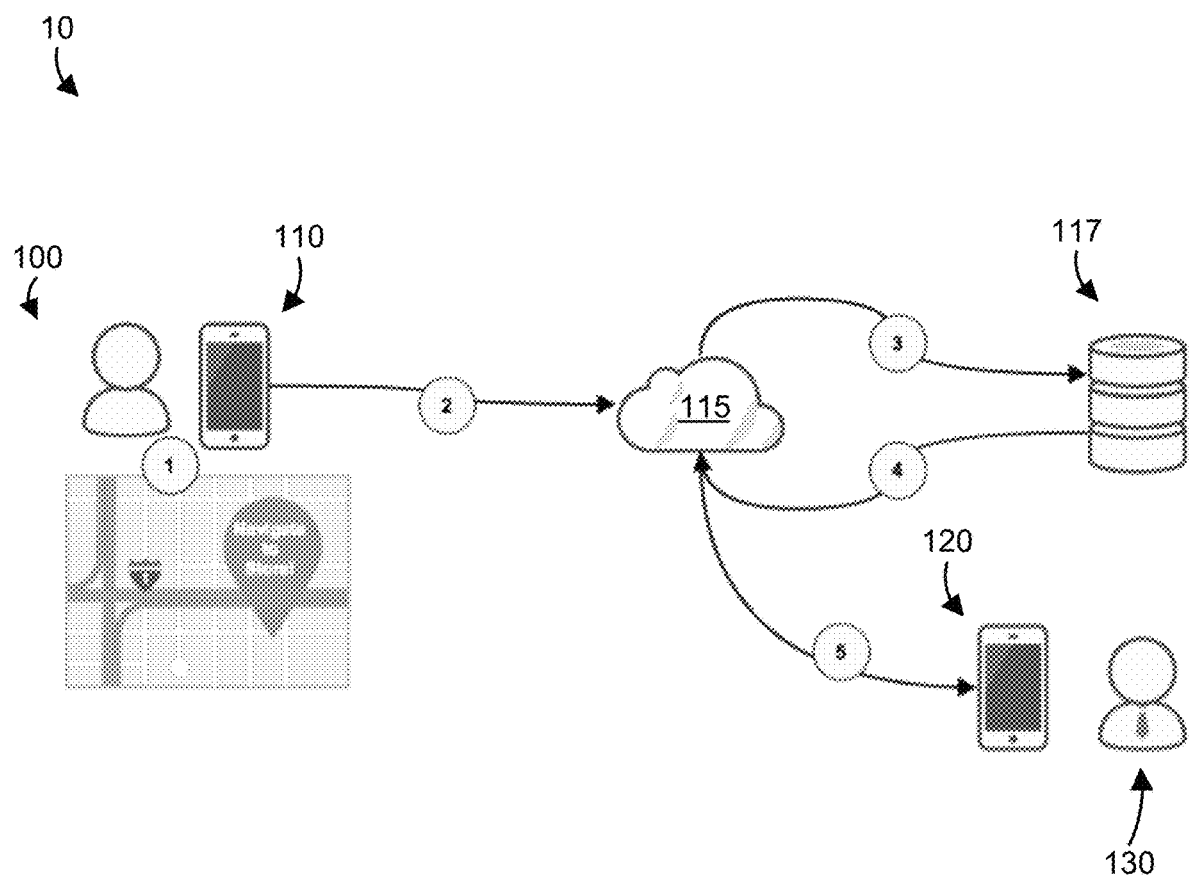
FIG. 1 illustrates an exemplary system and process for automatically notifying a sales associate that a customer intends to visit a traditional store.

FIG. 1 illustrates an exemplary system and process 10 for automatically notifying a sales associate that a customer intends to visit a traditional store. At step (1) customer 100 opens the retail store's application on her mobile communication device 110 (e.g., smartphone, laptop, tablet, or GPS device) and uses a store finder function to locate the closest traditional store. The store finder function can use GPS, cellular signals, or Wi-Fi signals to determine the current location of the smartphone. Alternatively, the customer can manually enter her location or a nearby landmark in the store finder. In some aspects, the application is running on a customer's mobile communication device, e.g., a smartphone that executes a program comprising a retailer app or application thereon. In further aspects, a customer can choose from a plurality of possible retail stores he or she is interested in. In still other aspects, a preferred retail store can be chosen by the customer or by a human or automated assistant based on some criteria such as geographic proximity, previously stored preferences, etc.

In one example, using the customer's location, a server or an application running on the customer's mobile communication device determines a closest traditional store, e.g., based on distance or travel time. The server or application returns the address of the closest traditional store to the user and asks the user whether she would like directions. In addition or in the alternative, the application can present the address of one or more of the customer's favorite traditional stores and/or the traditional stores that the customer most recently visited, each of which can be saved in the customer's profile. Such profiles and other data can be stored in one or more storage units, databases or memory devices, optionally coupled to a retail server 117.

If the user requests directions to the selected store, the application can provide the user with a choice of using the navigational software in the retail store's application or in another application (e.g., Google Maps or an integrated navigation interface). The application can also provide the user with an option to notify the retailer that the customer intends to visit the relevant store. This could be for example an option in the customer profiles, where the customer can permanently select to send such notifications.

If the customer agrees to notify the retailer, the application confirms that the customer has logged into the application. If the customer has not logged in, the application prompts the user for her access credentials. Notifications may be passed over any suitable communication network, including for example a cellular data network, Wi-Fi, local area and/or wide area network, or cloud-based communication infrastructure 115. A server or multiple servers, including a retail server responsible for conducting and coordinating customer transactions, a communications server or other devices can cooperatively communicate to achieve the present result, e.g., over cloud-based network 115.

At step (2), the application transmits a message to notify the retailer's server of the customer's actions. The message can include a customer ID identifying the customer to the retailer, the ID of the traditional store the customer intends to visit (as discussed above), and the customer's estimated arrival time, which is calculated from the customer current position and the location of the store. The message can include additional information such as the items or type of items for which the customer was browsing in the retailer's application within a pre-determined time period (e.g., one hour) of the customer using the store finder function. In addition or in the alternative, the message can include a request by the customer for the retailer to have certain items or sizes available when she arrives at the traditional store. For example, the customer may be interested in a certain outfit but she would like to try on different sizes of the outfit at the traditional store to ensure proper fit. In another example, the customer may be interested in a variety of outfits and she would like to try them to determine which one she likes best. In addition or in the alternative, the message can include a request by the customer to meet with a sales associate.

At step (3), the message is transmitted from the customer's device 110 to the retailer's server 117 over one or more communication networks 115. Based on the incoming message, the retailer's server can query a database of customer information to provide relevant information for a sales associate at the traditional store. For example, the server can query the database for profile and personal information regarding the customer, such as her name, gender, age, purchase history, browsing history (including the items or type of items for which the customer was browsing in the retailer's application within a pre-determined time period (e.g., one hour) of the customer using the store finder function (as discussed above), product ratings, and the like. The customer database can also return a photograph of the customer. The retailer's server combines the information in the incoming message with the information queried from the customer database to generate enriched customer information. In addition or in the alternative, the retailer's server can generate one or more recommendations for products or services for the customer based on some or all of the above information.

At step (4), the retailer's server 117 transmits an enriched message containing the enriched customer information to the traditional store via a communications network.

At step (5), the enriched message is routed to an associate mobile communication device, e.g., wireless device 120 (smartphone, tablet, laptop, smart watch, etc.) held by an appropriate store associate 130, as discussed below. An application on the associate's device can display some or all of the enriched customer information discussed above. For example, the application can display the customer's photograph and the estimated time of her arrival. In addition, the application can display one or more recommended products and/or the products that the customer requested to see at the traditional store (e.g., for sizing), as discussed above.

Figure 2:
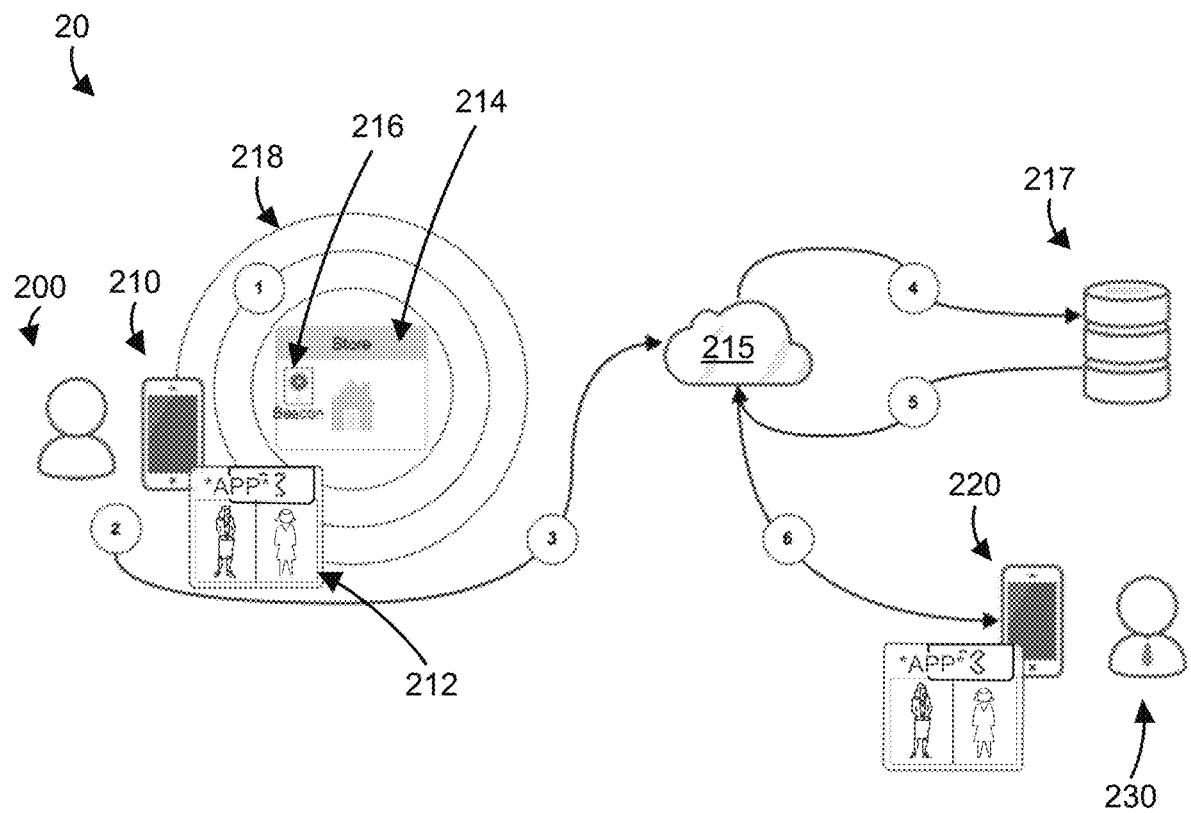
FIG. 2 illustrates an exemplary system and process for automatically notifying a sales associate that a customer arrives at a traditional store in which the associate is working.

FIG. 2 illustrates an exemplary system and process 20 for automatically notifying a sales associate 230 that a customer 200 arrives at a traditional store in which the associate 230 is working. The customer uses a first mobile communication device 210 having a processor, memory unit, and a plurality of wireless communication units such as a cellular communicator and a local wireless network communicator (e.g., Bluetooth, Wi-Fi or other beacon enabled transceiver). The first mobile communication device is also equipped to present a graphical user interface (GUI) 212 and adapted to execute instructions comprising a machine readable program enabling an app through said GUI.

At step (1), one or more location beacons 216, emanating wireless beacon signals in a beacon signal zone 218, are disposed at or near the entrance to the traditional store 214 and/or the region proximal to the traditional store (e.g., the parking lot or in a shopping center). The location beacons 216 can be based on Bluetooth Low Energy or other known technologies. In some embodiments, the location beacons conform to the iBeacon protocol (developed by Apple Inc.), the Eddystone protocol (developed by Google Inc. and available at https://github.com/google/eddystone), the Alt-Beacon protocol (developed by Radius Networks, Inc. and available at https://github.com/AltBeacon/spec), which are incorporated herein by reference, or other protocols known in the art.

At step (2), a customer 200 approaches or enters the traditional store holding the first mobile communication device 210 (or other portable wireless device) that runs the retail application (discussed above). At step (3), the device 210 and application 212 determine a location beacon 216 and transmit the beacon ID and the customer ID to the retailer's server 217 over a communication network (cellular, store Wi-Fi, other) 215.

At step (4), the server 217 queries a database to determine the location associated with the beacon ID and the identity of the sales associate 230 assigned to the customer (as discussed above). In some embodiments, the retailer server 217 and/or mobile communication device 210 can use the signal strength of the detected location beacon(s) 216 and trilateration to approximate the physical location of the customer 200 with respect to the beacons or the store. For example, the retailer server can factor in signal strength of each location beacon to better approximate the customer's location in a trilateration of multiple location beacons.

If the customer did not inform the retailer of her impending arrival (e.g., by using the store finder feature as discussed above), the retailer server can use the customer ID to query the database for profile and personal information regarding the customer 200. The retailer server can then transmit some or all of that information to the device 220 held by the relevant sales associate 230, as discussed above.

At step (5), the retailer server sends a message that includes some or all of the above information to the relevant sales associate 230 over a communication network, e.g., same cloud-based network 215.

At step (6), the sales associate 230 receives an alert with some or all of the information contained in the message. For example, the alert can include the customer's name, her photograph, and her approximate location (determined by the location beacon). The alert can also provide a link to access additional information regarding the customer, such as her order history and her product reviews.

In some embodiments, the sales associate's 230 device 220 can function as a location beacon. For example, when the customer 200 is browsing in the retail store, the sales associate 230 can open the associate application on her device 220 and select a special menu to find customers in the store. The associate's 230 device 220 can activate the Bluetooth antenna and send out a signal as a location beacon. If a customer has the retailer's shopping application installed, the sales associate's 230 beacon is recognized by the shopping application on the customer's 200 device 210 close to the sales associate's 230 position in the store. Once recognized, the shopping application can send a notification to the retailer's server. The sales associate's 230 device 220 can use signal strength and trilateration to locate the customer 200 as discussed above.

Figure 3:
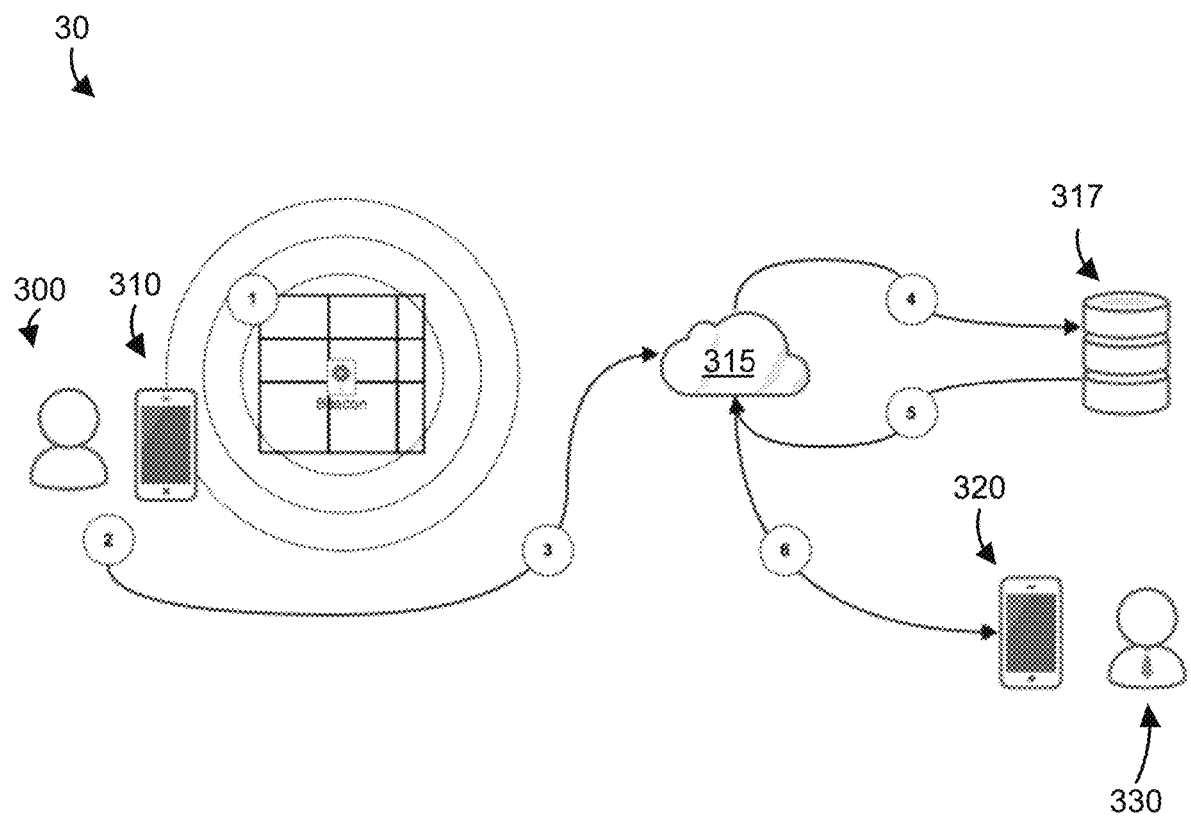
FIG. 3 illustrates an exemplary system and process for automatically notifying a sales associate that a customer is at a predetermined location with respect to or in a traditional store.

FIG. 3 illustrates an exemplary system and process 30 for automatically notifying a sales associate 330 that a customer 300 is at a predetermined location with respect to or in a traditional store. The predetermined location can be a department (e.g., women's wear), a region, a floor, a hot spot, or other location in the traditional store. At step (1), one or more wireless beacons are arranged in the traditional retail store. The identity of each beacon (e.g., beacon ID) is mapped to the physical location of the beacon and the corresponding sales area of the traditional store (e.g., men's wear, men's business suits, changing rooms, etc.). This information can be stored in a database in communication with the retailer's server, e.g., upon commissioning of the beacons or activation thereof.

At step (2), a customer 300 carrying a first mobile communication device 310 running the retailer application arrives at a particular location of the store (e.g., the jewelry department) in the traditional store. The application detects the beacon ID of the location beacon located near the jewelry department. At step (3), the application sends a message containing the beacon ID and the customer's ID across a network 315, which routes the information to the retailer server. At step (4), the retailer server logs the beacon ID, customer ID, and date and time of the message in a database. The retailer server then queries a database for customer information related to the customer ID, such as the customer's name, her order history, her gender, and other customer information as discussed above. The retail server and its database are collectively referred to as 317 herein, but those skilled in the art will understand that the database may be separate from or combined with the server, be connected over a network, or otherwise divided into several data stores.

The first mobile communication device 310 includes a variety of transceiver and communication hardware. For example, it may include a cellular data transceiver for sending and receiving data over a cellular network. It may also include a local area wireless communicator such as a Wi-Fi, Bluetooth, or infra-red transceiver, each of which is operated by an operating system and corresponding software on the mobile device. Also, the device may include a wireless beacon signal receiver circuitry for detecting and measuring one or more wireless radio frequency beacon signals emitted by fixed or mobile beacon transmitters. The retailer server 317 may also use the beacon ID to query a database for the physical location of the location beacon including the region, floor, hot spot, and or sales department associated with the beacon ID, as discussed above. In some embodiments, the retailer server can use the signal strength of the detected location beacon(s) and trilateration to approximate the physical location of the customer 300.

At step (5), the retailer server transmits a message across the network to the sales associate 330. The message can include the customer's name, the customer's photograph, the customer's order history, one or more product recommendations for the customer, the physical location of the beacon ID, and additional information as discussed above. At step (6), the message is routed to an appropriate sales associate (e.g., located near the location beacon that detected the customer), as discussed below. A corresponding application running on a smartphone 320 of the sales associate 330 can extract information from the message and display an alert on his smartphone 330. The alert can include some or all of the information contained in the message from the retailer server. For example, the alert can include the customer's name, her photograph, and her approximate location (determined by the location beacon). The alert can also provide a link to access additional information regarding the customer, such as her order history and her product reviews. In some embodiments, the smartphone 320 of the sales associate 330 can function as a location beacon, as discussed above.

In some embodiments, the application on the customer's smartphone 310 checks periodically whether the device 310 detects a beacon and determines the corresponding beacon ID if a beacon is detected. For example, the application can check every five seconds to determine if the smartphone 310 detects a beacon. By periodically checking for location beacons, the application can calculate how long the customer has been in range of a given beacon. The application can be configured to notify the retailer server if the smartphone 310 stays within range of a given beacon for a minimum or predetermined time period (e.g., 2 minutes, 3 minutes, 4 minutes, 5 minutes, etc.). In this way, the sales associate 330 is not notified unless the customer stops and browses for a minimum time period. Thus, the sales associate is not overwhelmed with alerts for customers passing through a department. In addition or in the alternative, the application can transmit the detected beacon ID periodically (e.g., every 5 seconds) to the application server and the application server can calculate how long the customer has been in range of a given beacon.

In addition or in the alternative, the application on the customer's 300 smartphone 310 can be configured to notify the retailer server when a new beacon ID is detected. This can allow the retailer server to track the customer's 300 path through the store.

Of course, in the examples above, the stated quantities (time periods for instance) are merely illustrative, can be substituted with other equivalent or alternative values, or adapted by one of ordinary skill in the art to their application.

Figure 4:
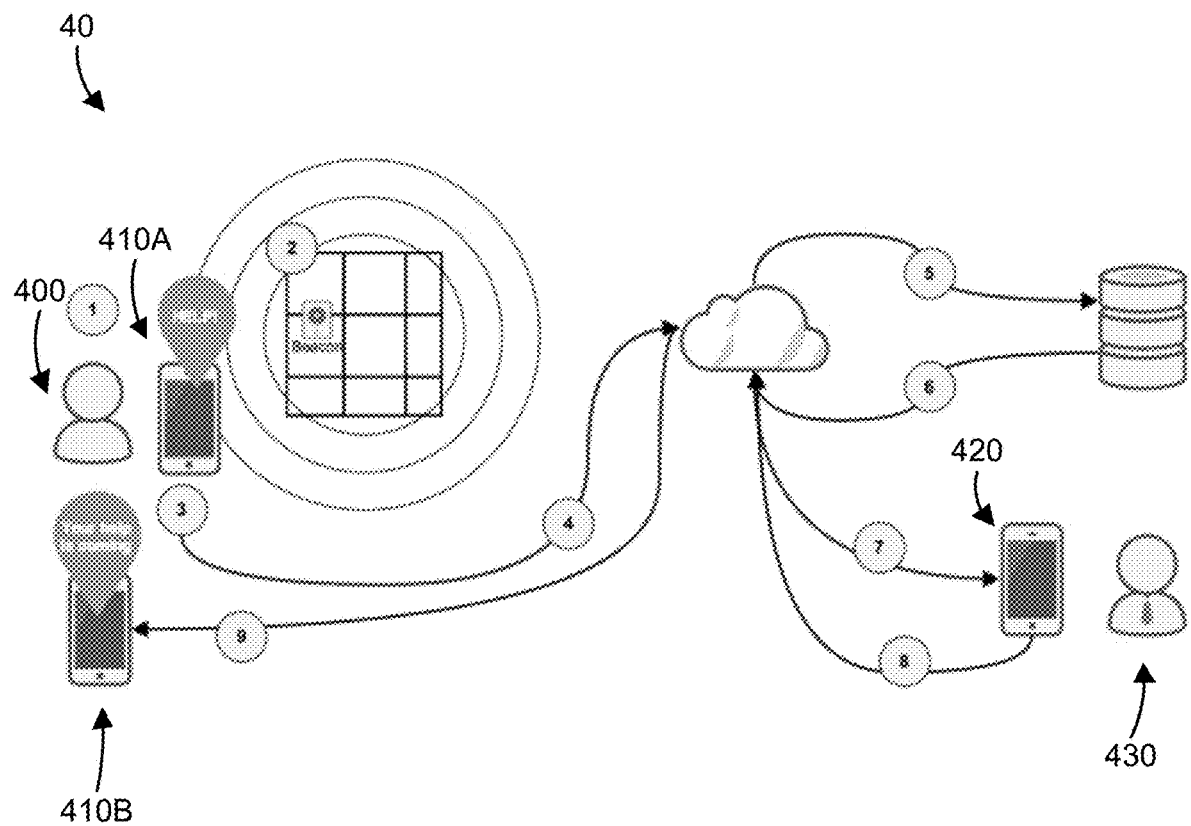
FIG. 4 illustrates an exemplary system and process for automatically notifying a sales associate that a customer at a predetermined location requests assistance.

FIG. 4 illustrates an exemplary system and process 40 for automatically notifying a sales associate that a customer at a predetermined location requests assistance. At step (1), a customer 400 opens an application on a smartphone 410A to request assistance. The request for assistance can be a general request for assistance or it can include more specific information (e.g., assistance with fitting, assistance with pricing, etc.). The customer 400 is located in a traditional store with configured with (2) a plurality of location beacons with corresponding beacon IDs, as discussed above. While the application is open, the application periodically checks for detection of a location beacon. At step (3), the application detects a location beacon and its corresponding beacon ID. At step (4), the application transmits a message containing the request for assistance, customer 400 identification information (e.g., customer ID), and the beacon ID to a communications network.

At step (5), the communications network routes the message to a retailer server. The retailer server can use the customer ID to query a database for the customer's name, order history, etc. (as discussed above). The retailer server can also use the beacon ID to query a database for the physical location of the location beacon including the region, floor, hot spot, and or sales department associated with the beacon ID, as discussed above. In some embodiments, the retailer server can use the signal strength of the detected location beacon(s) and trilateration to approximate the physical location of the customer 400. The retailer server can also log some or all of this information.

In some embodiments, the customer 400 can be in a fitting room that may have only a single location beacon for the entire fitting room area. The location beacon in the fitting room can be configured to have a low signal strength so it is only detected if the customer 400 is in the fitting room. If the application on customer device 410A detects a beacon ID associated with a fitting room and one or more additional beacon IDs, the application server can determine that the customer 400 is in the fitting room due to the reduced signal strength of the beacon ID associated with the fitting room. In such a case, the application server can ignore the signal from the beacon IDs outside the fitting room.

At step (6), the retailer server returns a message that includes the request for assistance, the customer that requested assistance including additional information regarding the customer, and the customer's location in the traditional store. This message from the retailer server is sent across a communications network and routed to a device 420 held by a sales associate 430 at step (7). The device 420 includes an application that extracts the information from the retailer server message and displays some or all of that information in an alert. The application on the device 420 can provide the sales associate 430 with an option to accept or deny the request for assistance. If the sales associate 430 accepts the request for assistance, at step (8) the application on the device 420 sends an acknowledgment back over the communications network (e.g., via the retailer server or directly) to the customer 400 device 420B, which can display a confirmation message to the customer 400. The confirmation message can include the name and a photograph of the sales associate 430 that is coming to assist the customer 400.

In some embodiments, the device 420 of the sales associate 430 can function as a location beacon, as discussed above.

As discussed above with respect to FIGS. 1-4, a request or message is directed or routed to a sales associate in a traditional store. Each sales associate on duty can have a handheld device 120, 220, 320, 420 running an application for servicing customers, as discussed above. Each sales associate can indicate through the application on his or her second mobile communication device whether he or she is on duty, on break, or off shift. This information is sent to the central retailer server, which keeps track of the availability and location of the sales associates, which is determined through detection of location beacons.

When a message or request needs to be routed to a sales associate, the retailer server first determines which sales associates are available at the relevant traditional store. The retailer server also determines via historical customer data whether any of the on-duty sales associates have worked with the customer in the past. If so, the retailer server routes the message or request to such a sales associate. If there are multiple on-duty sales associates that have previously worked with the customer, the retailer server can use one or more additional criteria, such as: (a) the sales associate that worked with the customer most recently, (b) the sales associate located closest to the customer, (c) the sales associate who has received the highest reviews by the customer and/or by other customers, (d) the most experienced sales associate in the department in which the customer is located, and/or (e) the gender of the sales associate (e.g., if the customer is in the fitting room).

If the customer is new or has not worked with any of the on-duty sales associates, the retailer server can route the message or request to all on-duty sales associates. Alternatively, the retailer server can route the message to a subset of on-duty sales associates based on the floor, department, or hot spot where the customer is located. In either case, the request can remain open for all of the relevant on-duty sales associates until one sales associate accepts the request (via the application running on his/her device). When a sales associate accepts the request, the request can be removed or marked as in progress (or similar) on the other sales associates' devices.

In addition or in the alternative, the retailer server can route the message to a first sales associate (e.g., based on location) for a predetermined time period (e.g., 30 seconds). If the first sales associate does not accept the message/request, the retailer server can route the message to a second sales associate (e.g., the next closest sales associate). This process can continue until one of the sales associates accepts the request.

Figure 5:
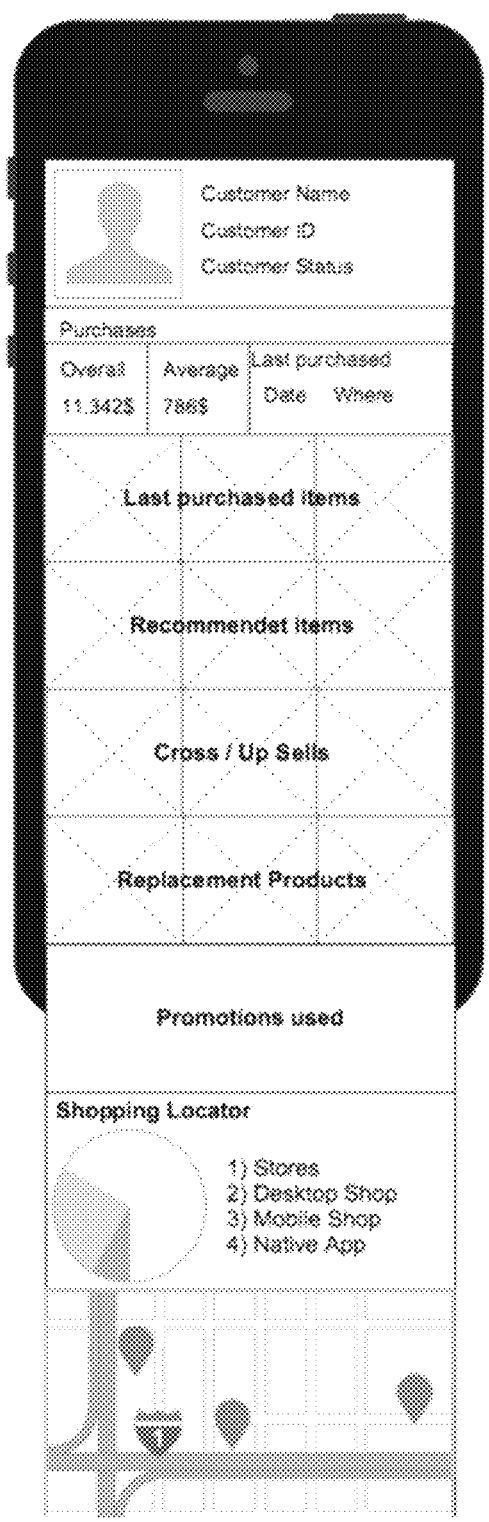
FIG. 5 illustrates an example of an application on a sales associate's device that provides access to information relating to a customer's request for assistance.

When a sales associate accepts the request, the application on the sales associate's device can display information about the customer, as discussed above. This information can include one or more of the following: the customer's name, the customer's address, the customer's photograph, the customer's status (e.g., silver, gold, platinum), the customer's last purchase (e.g., date, value, items purchased), the customer's overall purchases (e.g., date range, value, items purchased), the customer's average purchase (e.g., value, number of items), recommended products for the customer (e.g., based on past purchases, current location of customer in traditional store, path of customer through traditional store), related cross- and up-sells (e.g., based on past purchases, current location of customer in traditional store, path of customer through traditional store), frequency of purchases by customer, locations of purchases (e.g., in-store, mobile web, native application, desktop computer), past promotions used by customer, the identity of older products that may need to be replaced, and/or the products the customer has brought to the fitting room. An example of an application on a sales associate's device that provides access to some or all of this information is illustrated as FIG. 5.

The above customer information can be combined with data regarding the customer's online activities, such as the frequency of visits to the online store (via web and/or application), the conversion rate of those visits, the customer lifetime value (CLV), the customer's product preferences, the customer's wish lists saved on the customer's profile, the customer's product recommendations and reviews, and the customer's discount history. The data can also be combined with additional data available online about the customer, such as the customer's social media posts and profiles (e.g., Facebook, LinkedIn, etc.), the customer's blogs, etc. This can provide the retailer with a more comprehensive view of the customer to enhance customer service and product recommendations.

Figure 6:
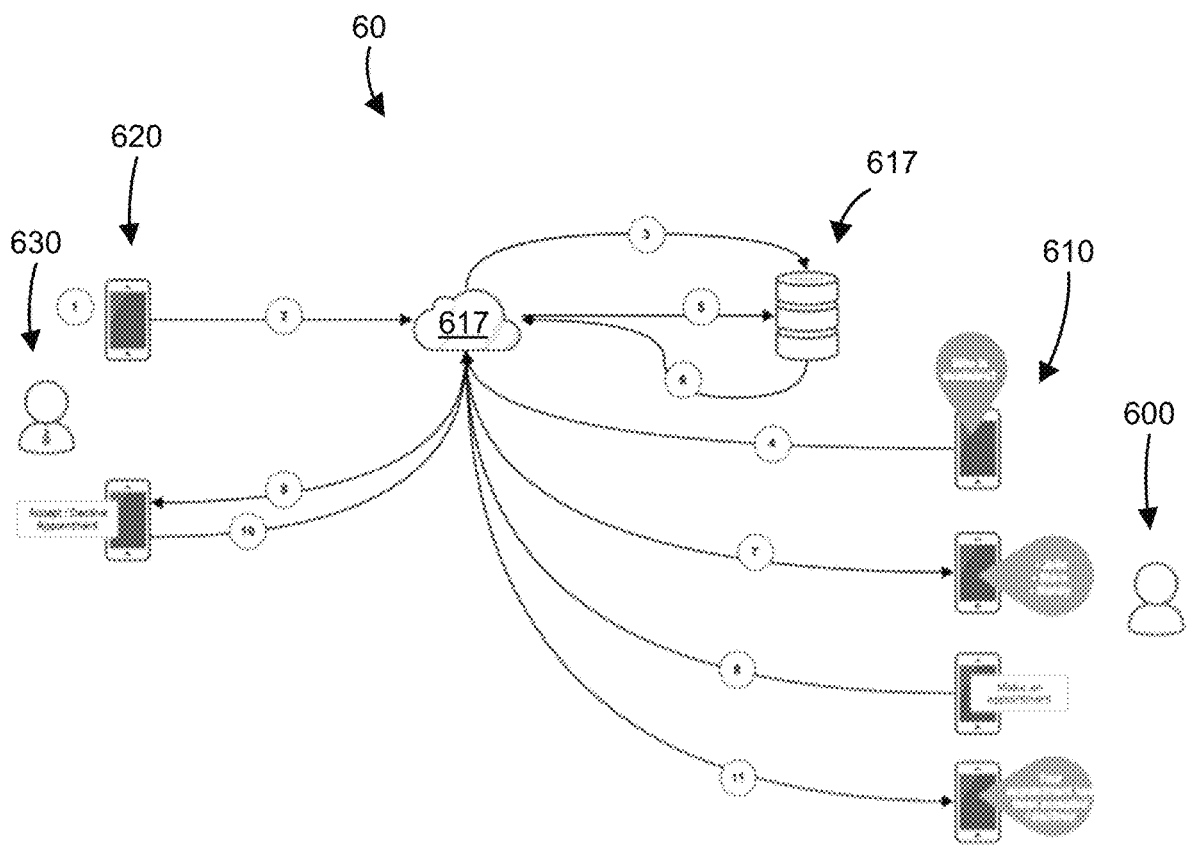
FIG. 6 illustrates an exemplary system and process for automatically making an appointment with a sales associate at a retail store.

FIG. 6 illustrates an exemplary system and process 60 for automatically making an appointment with a sales associate at a retail store. At step (1), a sales associate 630 logs in to an application on his mobile communication device 620 to indicate that he is on duty. At step (2), the on-duty status of the sales associate 630 is pushed in a message over a communications network, which routes the message to a retailer server. At step (3), the retailer server 617 registers the sales associate 630 as on-duty and available in the traditional store.

At step (4), a customer 600 opens a retail an application running on her device 610. Through the application, the customer 600 can access a list of the sales associates that are on duty in the traditional store. The list can include the names of the sales associates, their respective departmental specialty or specialties (e.g., men's wear, jewelry, etc.), and the length of their respective shifts. The application sends a request to the retailer server for a list of the on-duty sales associates.

At step (5), the customer's request is routed to the retailer server where it is matched with information on the on-duty and available sales associates. At step (6), the retailer sends that information back over the network to the customer 600. At step (7), the customer 600 can view the list of on-duty sales associates on his device 610.

At step (8), the customer 610 can use the application on her device 610 to request an appointment with a particular on-duty sales associate or an appointment with any on-duty sales associate. A general appointment request can include information regarding the sales department relevant to the appointment.

At step (9), the appointment request is routed to the appropriate sales associate(s). If a particular sales associate is requested, only that sales associate receives the appointment request. If a general appointment request is made, then multiple sales associates can receive the request, as discussed above. For example, the request can be sent to all on-duty sales associates or a subset of the on-duty sales associates (e.g., the sales associates on a particular floor or that have a given sales specialty).

At step (10), the sales associate accepts or declines the appointment request. The action by the sales associates is sent over the network to the retailer server and to the customer's device, where the accept/decline is displayed in (11).

Figure 7A:
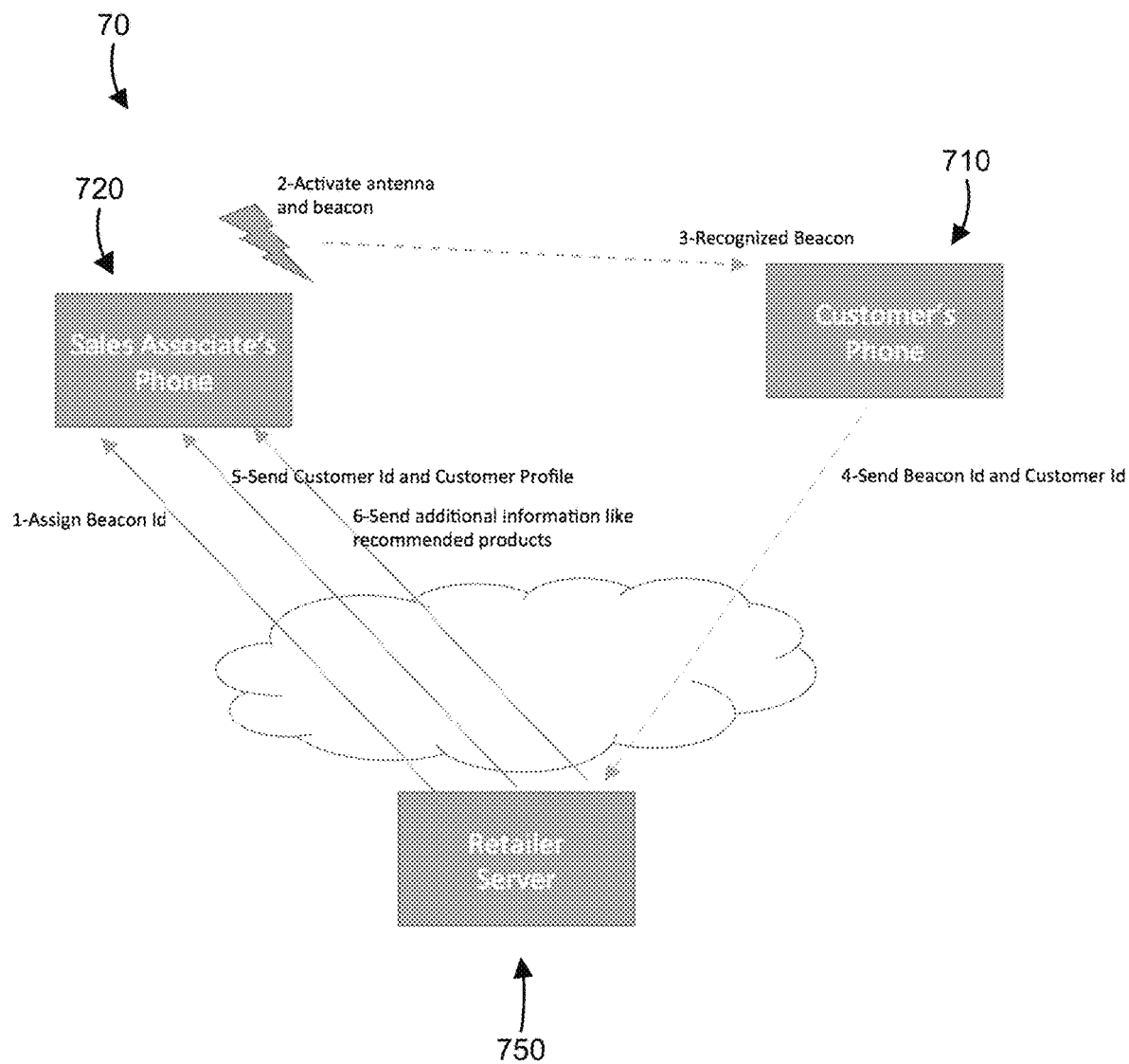
FIGS. 7A and 7B illustrate an exemplary system and process for automatically populating customer information when ordering products in store for delivery.
Figure 7B:
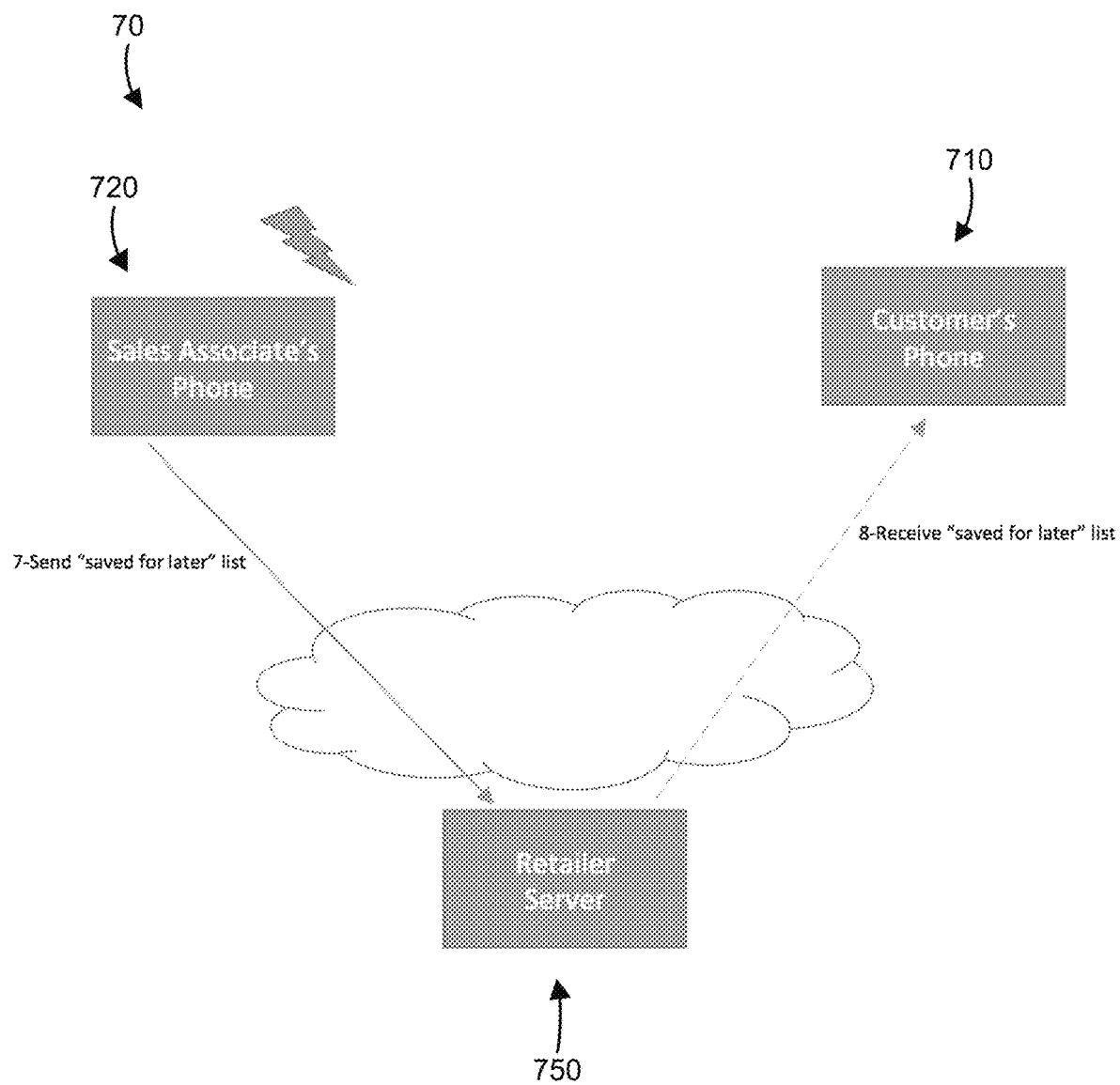

FIGS. 7A-7B illustrate an exemplary system and process 70 for automatically populating customer information when ordering products in store for delivery. When a customer orders in the store items for delivery with a sales associate, the sales associate typically places the order on behalf of the customer. In the prior art, the sales associate would either manually type in the customer's shipping address or, if the customer was already in the system (e.g., due to a past purchase), the sales associate could manually look her up in a customer database. In the system and process 70, the associate can automatically obtain the customer's information without manual entry.

In step (1), the retailer server 750 assigns a unique beacon ID (including a major and minor ID number) to the sales application running on the sales associate's device 720. This can happen, for example, when the sales associate logs in at the beginning of her shift. Alternatively, the retailer server 750 can dynamically assign a unique beacon ID number to the sales application (e.g., when the sales associate opens the sales application for home delivery orders). In step (2), the sales application activates the Bluetooth antenna on the sales associate's device 720 and sends out a beacon signal using the major and minor ID number assigned by the retailer server 750. In step (3), the customer holds her device 710 in close proximity to the associate's device 720. The shopping application running on the customer's device 710 recognizes the close proximity of the associate's beacon signal. In step (4), the customer's device 710 sends a message with the detected beacon ID (including the major and minor numbers) and the customer ID from the customer's profile to the retailer server 750. From the beacon ID number, the retailer server 750 determines that the beacon signal comes from a sales associate's application and it can also identify the exact associate device assigned the unique major and minor ID number. In step (5), the retailer server 750 informs the sales associate's application that a shopping application on customer device 710 is in close proximity and also sends customer profile information to the sales associate app. The customer profile information can include information like the customer ID, the customer's preferred shipping address and billing address, and an indication that the customer's stored credit card can be used to make the purchase. This information is then automatically filled into the order, which can be placed by the sales associate on behalf of the customer.

In step (6), the retailer server 750 can optionally send a list of recommended up-sell and recommended products to the sales associate's device 720. The sales associate can then offer these suggested products to the customer for inclusion into the order. The retail server 750 can identify one or more of the recommended up-sell products based on the customer's past activities like past purchases or past viewed items from the online store (website or native application) and/or past in-store purchases.

In some embodiments, the associate application can send information via the retailer's server 750 to the customer's phone 710. For example, in step (7) if the customer is not sure about purchasing certain items, the sales associate can place those items in a "saved for later" list in the sales application. The sales application can transmit that list to the retailer server 750 to store in the customer's profile. In step (8), the retailer server 750 transmits the "saved for later" list to the customer's device 710 (e.g., in a message) where the customer can later review and/or purchase one or more of those items using the sales application or web store.

Therefore, the present disclosure allows for enhanced customer service and product recommendations by combining online and in-store interactions and data. Customers and sales representatives can communicate using applications on their respective devices. In addition, sales representatives can obtain enhanced customer information prior to interacting with a given customer. Retailers can obtain additional data regarding customer actions and preferences in-store and online, for example by using location beacons in the store to determine the location and path of customers within the store. Location beacons can also be used to locate the customer when he arrives and in response to requests for assistance.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. For example, those of ordinary skill in the art will readily envision a variety of other means and/or structures for performing the function and/or obtaining the results and/or one or more of the advantages described herein, and each of such variations and/or modifications is deemed to be within the scope of the embodiments described herein.

Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

The above-described embodiments may be implemented in any of numerous ways. One or more aspects and embodiments of the present application involving the performance of processes or methods may utilize program instructions executable by a device (e.g., a computer, a processor, or other device) to perform, or control performance of, the processes or methods.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement one or more of the various embodiments described above.

The computer readable medium or media may be transportable, such that the program or programs stored thereon may be loaded onto one or more different computers or other processors to implement various ones of the aspects described above. In some embodiments, computer readable media may be non-transitory media.

The terms "program" or "software" are used herein in a generic sense to refer to any type of computer code or set of computer-executable instructions that may be employed to program a computer or other processor to implement various aspects as described above. Additionally, it should be appreciated that according to one aspect, one or more computer programs that when executed perform methods of the present application need not reside on a single computer or processor, but may be distributed in a modular fashion among a number of different computers or processors to implement various aspects of the present application.

Computer-executable instructions may be in many forms, such as program modules, executed by one or more computers or other devices. Generally, program modules include routines, programs, objects, components, data structures, etc. that performs particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The present disclosure should therefore not be considered limited to the particular embodiments described above. Various modifications, equivalent processes, as well as numerous structures to which the present disclosure may be applicable, will be readily apparent to those skilled in the art to which the present disclosure is directed upon review of the present disclosure.

What is claimed is:

1. A method for enhancing retail services to customers of a retail store, comprising:
   on a first mobile communication device associated with a retail customer, activating a retail application executing in a processor of said first mobile communication device;
   establishing a communication link between said first mobile communication device and a server responsive to activation of said retailer application on the first mobile communication device;
   using geographic location circuitry in said first mobile communication device to determine a geographic location of the first mobile communication device;
   responsive to activation of said retailer application, and based at least in part on said geographic location of the first mobile communication device, determining a preferred retail store location;
   providing to said first mobile communication device a retail store identifier corresponding to the preferred retail store location, the first mobile communication device storing said retail store identifier in a memory unit in the first mobile communication device;
   activating a beacon signal receiver circuit in said first mobile communication device responsive to a wireless beacon signal encoding the retail store identifier, said beacon signal receiver generating an output responsive to a wireless beacon signal broadcast by a beacon transmitter located at said preferred retail store location;
   the beacon receiving circuit of said first mobile communication device providing an output to a processor in said first mobile communication device, said processor confirming that the received beacon signal encodes the retail store identifier by comparing data from said received beacon signal with the retail store identifier stored in said memory unit;
   sending, from said first mobile communication device, over said cloud-based communication network, a first signal to a server coupled to said cloud-based communication network;
   sending a notification message from the server to a plurality of second mobile communication devices, each second mobile communication device associated with a respective associate of said retail store, the notification message indicative of an arrival event of the customer associated with said first mobile communication device with respect to the preferred retail store location;
   sending, from a respective customer service application executing in a processor of each second mobile communication devices to the server, an availability message indicating an availability of each said associate;
   sending, from said first mobile communication device, over said cloud-based communication network, a request for assistance;
   selecting, by the server, a selected associate to respond to the request for assistance based, at least in part, on the availability of each associate;
   sending an appointment request corresponding to said selecting step to said selected associate; and
   receiving, at said server, a notification from said selected associate's mobile communication device to accept or decline said appointment request.

2. The method of claim 1, determining said preferred retail store location comprising determining a nearest retail store location relative to the geographic location of said first mobile communication device.

3. The method of claim 1, determining said preferred retail store location comprising looking up a stored preference of said customer.

4. The method of claim 1, determining said preferred retail store location comprising providing a retail store locator through said retailer application on the first mobile communication device, and manually selecting in a user interface of said retailer application the preferred retail store location from a plurality of presented retail store locations.

5. The method of claim 1, further comprising providing the preferred retail store location to a navigation application executing in said first mobile communication device and outputting from said navigation application instructions for travel from the geographic location of said first mobile communication device to said preferred retail store location.

6. The method of claim 1, further comprising encoding in said notification message an expected arrival time of said customer at the preferred retail store location.

7. The method of claim 1, further comprising in said notification message including customer preference information for the customer, said customer preference information extracted from a database of customer preference data accessible to said retailer.

8. The method of claim 1, further comprising receiving from said first mobile communication device a message comprising information regarding a particular item of commerce, and including said information regarding said particular item of commerce in the notification message sent to the second mobile communication devices.

9. The method of claim 1, further comprising encoding in said notification message an image representing said customer and other customer information associated with said customer, and presenting the same on a viewing screen of the second mobile communication devices.

10. The method of claim 1, the step of establishing said communication link comprising establishing an authenticated connection between said first mobile communication device and a server over said cloud-based communication network.

11. The method of claim 1, the wireless beacon signal encoding said retail store identifier comprising an iBeacon signal.

12. The method of claim 1, the step of using geographic location circuitry in said first mobile communication device to determine a geographic location of the first mobile communication device comprising: determining the first mobile communication device's geographic location using a global positioning system (GPS) circuit in said first mobile communication device.

13. The method of claim 1, the step of activating a beacon signal receiver circuit in said first mobile communication device comprising: receiving a plurality of wireless beacon signals and approximating a position of said first mobile communication device with respect to respective beacon transmitters based on respective signal strengths of said plurality of wireless beacon signals received by the first mobile communication device.

14. The method of claim 13, further comprising executing a set of stored machine readable instructions on the server to determine if said first mobile communication device within said preferred retail store location has met one or more criteria encoded in said stored machine readable instructions, and if so, to alert the second mobile communication device of the selected associate that one or more such criteria have been met.

15. The method of claim 1, said geographic location of the first mobile communication device corresponding to a wide area location and the wireless beacon signal corresponding to a local area location determined by a wireless communication range of said beacon transmitter.

16. The method of claim 1, said beacon signal being emitted by the second mobile communication device, co-located with said retail associate in said preferred retail store location, the second mobile communication device broadcasting said beacon signal from a beacon transmitting circuit and radio frequency antenna disposed in said second mobile communication device.

17. The method of claim 1, further comprising providing to said first mobile communication device a retail store associate identifier corresponding to the retail store associate working at said preferred retail store location.

18. The method of claim 1, the notification message indicative of an arrival event of the customer associated with said first mobile communication device with respect to the preferred retail store location comprising an indication of an expected time of arrival of said customer at said preferred retail store location.

19. The method of claim 1, the notification message indicative of an arrival event of the customer associated with said first mobile communication device with respect to the preferred retail store location comprising an indication of an actual arrival of said customer at said preferred retail store location.

20. The method of claim 1, wherein the selected associate is selected based, at least in part, on historical customer data for the retail customer, the historical customer data including a list of sales associates that have worked with the retail customer in the past.

\* \* \* \* \*